US008260052B1

(12) United States Patent
Scannell et al.

(10) Patent No.: US 8,260,052 B1
(45) Date of Patent: Sep. 4, 2012

(54) OBJECT IDENTIFICATION VIA DATA FUSION

(75) Inventors: Brian J. Scannell, Cambridge, MA (US); Kenric P. Nelson, Hollis, NH (US); Nora T. Tgavalekos, Tewksbury, MA (US); Ethan Phelps, Arlington, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/956,637

(22) Filed: Nov. 30, 2010

(51) Int. Cl.
*G06K 9/00* (2006.01)

(52) U.S. Cl. .......................... 382/181; 342/90

(58) Field of Classification Search .................. 382/181; 342/90
See application file for complete search history.

(56) References Cited

U.S. PATENT DOCUMENTS

| | | | |
|---|---|---|---|
| 5,202,661 | A | 4/1993 | Everett, Jr. et al. |
| 5,341,142 | A | 8/1994 | Reis et al. |
| 6,897,802 | B1 | 5/2005 | Daniell et al. |
| 6,909,997 | B2 | 6/2005 | Chen et al. |
| 7,006,869 | B2 | 2/2006 | Bradley |
| 7,065,465 | B2 | 6/2006 | Chen et al. |
| 7,079,023 | B2 | 7/2006 | Haller |
| 7,099,796 | B2 | 8/2006 | Hamza |
| 7,576,681 | B2 | 8/2009 | Chen et al. |
| 7,719,461 | B1 | 5/2010 | Mookerjee et al. |
| 2006/0082490 | A1* | 4/2006 | Chen et al. ........................ 342/52 |
| 2010/0070238 | A1 | 3/2010 | Phelps et al. |

OTHER PUBLICATIONS

Tilmann Gneiting and Adrian E. Raftery; Strictly Proper Scoring Rules, Prediction, and Estimation; Journal of the American Statistical Association; Mar. 2007; vol. 102, No. 477; pp. 359-378.

Alfred O. Hero, Bing Ma, Olivier Michel and John Gorman; Alpha-Divergence for Classification, Indexing and Retrieval; Communications and Signal Processing Laboratory Technical Report CSPL-328; May 2001 (revised Dec. 2002); 25 pages.

Josef Kittler, Mohamad Hatef, Robert P.W. Duin and Jiri Matas; On Combining Classifiers; IEEE Transactions on Pattern Analysis and Machine Intelligence; Mar. 1998; vol. 20, No. 3; pp. 226-239.

Jane O'Brien; Correlated Probability Fusion for Multiple Class Discrimination; Defence Evaluation and Research Agency; 1999; 6 pages.

Robi Polikar; Ensemble Based Systems in Decision Making; IEEE Circuits and Systems Magazine; Third Quarter 2006; pp. 21-45.

Hiroki Suyari and Makoto Tsukada; Law of Error in Tsallis Statistics; IEEE Transactions on Information Theory; Feb. 2005; vol. 51, No. 2; pp. 753-757.

David M.J. Tax, Martijn Van Breukelen, Robert P.W. Duin and Josef Kittler; Combining Multiple Classifiers by Averaging or by Multiplying?; Pattern Recognition; vol. 33; 2000; pp. 1475-1485.

Ludmila I. Kuncheva; Combining Pattern Classifiers Methods and Algorithms; 2004; pp. 151-188.

* cited by examiner

*Primary Examiner* — Timothy A Brainard
(74) *Attorney, Agent, or Firm* — Pierce Atwood LLP; Joseph M. Maraia

(57) ABSTRACT

The technology described herein includes a system and/or a method for identifying an object. The technology includes determining an alpha parameter that is associated with a fusion function. The technology includes determining a beta parameter that is associated with a degree of expected independence of a received set of data and the received set of data including information associated with a classification of the object. The technology includes fusing the received set of data based on the alpha parameter and the beta parameter. The technology includes generating a probability of identification of the classification of the object based on the fused data.

17 Claims, 11 Drawing Sheets

OBJECT IDENTIFICATION VIA DATA FUSION

GOVERNMENT SUPPORT

The invention was supported, in whole or in part, by a grant, Grant No. HQ0147-09-C-0008, from the Department of Defense. The Government has certain rights in the invention.

BACKGROUND

Object discrimination is the process of taking radar measurements and creating a vector of probabilities that the object in track is a known object type. Prior attempts at object discrimination focused on ensuring that the largest probability would be assigned to the actual classification as often as possible and combined discrimination data using additive or multiplicative techniques which generally resulted in overconfident behavior. The probabilities were generally close to binary. As such, uncertainty in discrimination results was not represented within the classifications. Thus, a need exists in the art for improved object discrimination.

SUMMARY

One approach to determining confidence of object identification is a system. The system includes a communication module configured to receive a first object identification of an object. The first object identification includes first discrimination identification and one or more first identification parameters. The system further includes an object identification module configured to generate a second object identification of the object based on a received set of data. The second object identification includes second discrimination identification and one or more second identification parameters. The system further includes a confidence rules module configured to select at least one confidence rule from a plurality of confidence rules based on the first discrimination identification and the second discrimination identification; an object confidence module configured to generate an object confidence weight based on the one or more first identification parameters, the one or more second identification parameters, and the selected at least one confidence rule; and a data fusion module configured to fuse the received set of data based on an alpha parameter, a beta parameter, and the object confidence weight, the alpha parameter associated with a fusion function and the beta parameter associated with a degree of expected independence of a received set of data and the received set of data includes information associated with a classification of the object; and a probability of identification module configured to generate a probability of identification of the object based on the fused data.

Another approach to determining confidence of object identification is a method. The method includes receiving a first object identification of an object, the first object identification includes first discrimination identification and one or more first identification parameters; generating a second object identification of the object based on a received set of data, the second object identification includes second discrimination identification and one or more second identification parameters; selecting at least one confidence rule from a plurality of confidence rules based on the first discrimination identification and the second discrimination identification; generating an object confidence weight based on the one or more first identification parameters, the one or more second identification parameters, and the selected at least one confidence rule; fusing the received set of data based on an alpha parameter, a beta parameter, and the object confidence weight, the alpha parameter associated with a fusion function and the beta parameter associated with a degree of expected independence of a received set of data and the received set of data includes information associated with a classification of the object; and generating a probability of identification of the classification of the object based on the fused data.

Another approach to determining confidence of object identification is a computer program product. The computer program product is tangibly embodied in an information carrier. The computer program product includes instructions being operable to cause a data processing apparatus to receive a first object identification of an object, the first object identification includes first discrimination identification and one or more first identification parameters; generate a second object identification of the object based on a received set of data, the second object identification includes second discrimination identification and one or more second identification parameters; select at least one confidence rule from a plurality of confidence rules based on the first discrimination identification and the second discrimination identification; generate an object confidence weight based on the one or more first identification parameters, the one or more second identification parameters, and the selected at least one confidence rule; fuse the received set of data based on an alpha parameter, a beta parameter, and the object confidence weight, the alpha parameter associated with a fusion function and the beta parameter associated with a degree of expected independence of a received set of data and the received set of data includes information associated with a classification of the object; and generate a probability of identification of the classification of the object based on the fused data.

Another approach to identifying an object is a system. The system includes an alpha parameter module configured to determine an alpha parameter. The alpha parameter is associated with a fusion function. The system further includes a beta parameter module configured to determine a beta parameter. The beta parameter is associated with a degree of expected independence of a received set of data and the received set of data includes information associated with a classification of the object. The system further includes a data fusion module configured to fuse the received set of data based on the alpha parameter and the beta parameter; and a probability of identification module configured to generate a probability of identification of the classification of the object based on the fused data.

Another approach to identifying an object is a method. The method includes determining an alpha parameter, the alpha parameter associated with a fusion function; determining a beta parameter, the beta parameter associated with a degree of expected independence of a received set of data and the received set of data includes information associated with a classification of the object; fusing the received set of data based on the alpha parameter and the beta parameter; and generating a probability of identification of the classification of the object based on the fused data.

Another approach to identifying an object is a computer program product. The computer program product is tangibly embodied in an information carrier. The computer program product includes instructions being operable to cause a data processing apparatus to determine an alpha parameter, the alpha parameter associated with a fusion function; determine a beta parameter, the beta parameter associated with a degree of expected independence of a received set of data and the received set of data includes information associated with a classification of the object; fuse the received set of data based on the alpha parameter and the beta parameter; and generate a probability of identification of the classification of the object based on the fused data.

In other examples, any of the approaches above can include one or more of the following features.

In some examples, the data fusion module further configured to fuse the received set of data based on a second alpha parameter, a second beta parameter, the object confidence weight, the probability of identification, and the first object identification, the second alpha parameter associated with a fusion function and the second beta parameter associated with a degree of expected independence of a received set of data and the received set of data includes information associated with the classification of the object.

In other examples, the object identification module further configured to generate an object identification based on the first discrimination identification, the second discrimination identification, and the probability of identification.

In some examples, the confidence rules module further configured to generate the plurality of confidence rules based on the first object identification, the second object identification, and/or one or more pre-defined relationships between the first object identification and the second object identification.

In other examples, the system further includes a confidence rules storage module configured to store the plurality of confidence rules. In some examples, the plurality of confidence rules are pre-defined. In other examples, the plurality of confidence rules are modifiable.

In some examples, the one or more identification parameters for each of the object identifications is indicative of a characteristic of an object associated with the first object identification, and/or the second object identification.

In other examples, the characteristics of the object include a physical characteristic of the object.

In some examples, the object confidence weight is indicative of the discrimination identification for each object identification accurately identifying an object associated with the first object identification, and/or the second object identification.

In other examples, the method includes fusing the received set of data based on a second alpha parameter, a second beta parameter, the object confidence weight, the probability of identification, and the first object identification, the second alpha parameter associated with a fusion function and the second beta parameter associated with a degree of expected independence of a received set of data and the received set of data includes information associated with the classification of the object.

In some examples, the method includes generating an object identification based on the one or more first identification parameters, the one or more second identification parameters, and the selected at least one confidence rule.

In other examples, the method includes generating the plurality of confidence rules based on the first object identification, the second object identification, and/or one or more pre-defined relationships between the first object identification and the second object identification.

In some examples, the method includes generating the first object identification based on a first discrimination function; and generating the second object identification based on a second discrimination function.

In other examples, the object confidence weight is indicative of the discrimination identification for each of the object identification accurately identifying an object associated with the first object identification and the second object identification.

In some examples, the system further includes a communication module configured to receive the set of data at a plurality of times, the plurality of times being near a time.

In other examples, the communication module further configured to receive a set of second data at a second plurality of times, the second plurality of times being near a second time, and the time being different from the second time; the data fusion module further configured to fuse the received set of second data based on the alpha parameter and the beta parameter; and the probability of identification module further configured to generate a second probability of identification based on the fused data and the second fused data.

In some examples, the system further includes a multi-look data module configured to request the received set of second data based on the probability of identification.

In other examples, the system further includes a multi-look data module configured to prioritize a request for the received set of second data based on one or more resource parameters associated with the system.

In some examples, the probability of identification is indicative of the identified object being a target object. In other examples, the received set of data includes radar signal.

In some examples, the system further includes a communication module configured to receive the set of data from a plurality of data sources. In other examples, the method further includes selecting the fusion function based on the alpha parameter and the beta parameter. In some examples, the fusion function is a quadratic mean function, an average function, a log-average function, a harmonic mean function, or an independent product rule function. In other examples, the method further includes extrapolating and/or interpolating fusion functions based the alpha parameter and the beta parameter.

In other examples, the received set of data includes a plurality of object classification probabilities, the plurality of object classification probabilities includes information associated with the object at a plurality of sequential times, and the fusing the received set of data based on the alpha parameter and the beta parameter further includes fusing the plurality of object classification probabilities based on the alpha parameter and the beta parameter.

In some examples, the fused data is calculated in accordance with equation:

If any $|\alpha_i| < TOL$

If $\sum_{j=1}^{N} w_j < 1$ $$W_i = 1$$

else $$W_i = \left[\sum_{j=1}^{N} w_j\right]^{\beta_i - 1}$$

$$P(\omega_i | x_1, x_2, \ldots, x_N) = \frac{P(\omega_i)\left(\prod_{j=1}^{N} P(\omega_i | x_j)^{w_j}\right)^{W_i}}{\sum_{k=1}^{C}\left[P(\omega_k)\left(\prod_{j=1}^{N} P(\omega_i | x_j)^{w_j}\right)^{W_k}\right]}$$

else $$V = \sum_{j=1}^{N} w_j$$

If $\sum_{j=1}^{N} w_j < 1$ $$W_i = V$$

else $$W_i = V^{\beta_i}$$

$$P(\omega_i | x_1, x_2, \ldots, x_N) = \frac{P(\omega_i)\left(\frac{1}{V}\sum_{j=1}^{N} w_j P(\omega_i | x_j)^{\alpha_i}\right)^{\frac{W_i}{\alpha_i}}}{\sum_{k=1}^{C}\left[P(\omega_k)\left(\frac{1}{V}\sum_{j=1}^{N} w_j P(\omega_k | x_j)^{\alpha_k}\right)^{\frac{W_k}{\alpha_k}}\right]}$$

whereas
$x_j$=Individual classifier execution to be combined
$P(\omega_i)$=Prior probability of the $i^{th}$ class
$P(\omega_i | x_j)$=Posterior probability of the $i^{th}$ class for the $j^{th}$ classifier execution, created without the use of prior probabilities
$P(\omega_i | x_1, \ldots, x_N)$=Posterior probability of the $i^{th}$ class after fusing classifier executions 1 through N
N=Number of classifier executions
C=Number of object classes
$\alpha_i, \beta_i$=Input parameters that determine the type of combining, specified per class
$w_j$=Weight associated with the $j^{th}$ classifier execution, default value=1 TOL=tolerance The object discrimination techniques described herein can provide one or more of the following advantages. An advantage to the object discrimination techniques is that sensors and/or weapon resources can be efficiently and effectively allocated based on the actual confidence levels of the object identifications, thereby reducing the resources needed to identify and/or track objects. Another advantage to the object discrimination techniques is that the data fusion includes variations in the fusion process (i.e., different alpha and beta parameters) as the independence and confidence in the received data varies, thereby increasing the confidence level of the identification while allowing for flexibility in the received data. An additional advantage to the object discrimination techniques is the combination of the probabilities, the quality of the discrimination result, the prioritization of resources in the form of additional looks, and the utilization of time frames to form a discrimination result increases the confidence in the object identification without significantly increasing the resource usage, thereby increasing the usefulness of the technology and optimizing the processing time for the technology.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The object discrimination method and apparatus includes technology that, generally, identifies classification of objects via data fusion and/or determines confidence of object identification. The technology can be utilized for resource allocation (e.g., human resource, electronic resource, physical resource, military resource, medical resources, etc.) and/or planning (e.g., financial accounts, military planning, etc.) by improving the identification of the state of the object (also referred to as the object classification) and/or determining the confidence of the object identification. The state of the object can be any type of classification (e.g., physical object classification, image classification, medical classification, state of nature classification, stock price classification, financial classification, electronic classification, etc.). The confidence of the object identification can be the probability that the object classification is the actual state of the object (also referred to as the true object). The technology utilizes data fusion, confidence logic (e.g., rules that provide confidence in the classification method), and/or multiple looks to provide confidence in the status of object discrimination (e.g., the probability of the object identification). For example, for optical character recognition, additional processing resources can be allocated to the characters and/or words with the lowest confidence level to confirm the identification of the characters and/or words. As another example, for airplane tracking, tracking resources can be allocated to the airplanes with the highest confidence level of being a threat to allocate defensive/offensive resources to track/intercept the airplanes.

In some examples, the technology can transmit the object identifications and/or the confidence of the object identifications to control units. The control units can allocate sensor and/or weapon resources and/or make shoot/no-shoot decisions based on the identifications and/or confidence of the identifications. For example, the technology can be utilized for target object maps to assist exoatmospheric kill vehicles in on-board decisions for disabling a threat (e.g., probability of an object being a threat, probability of an object being a decoy, etc.).

Figure 1:
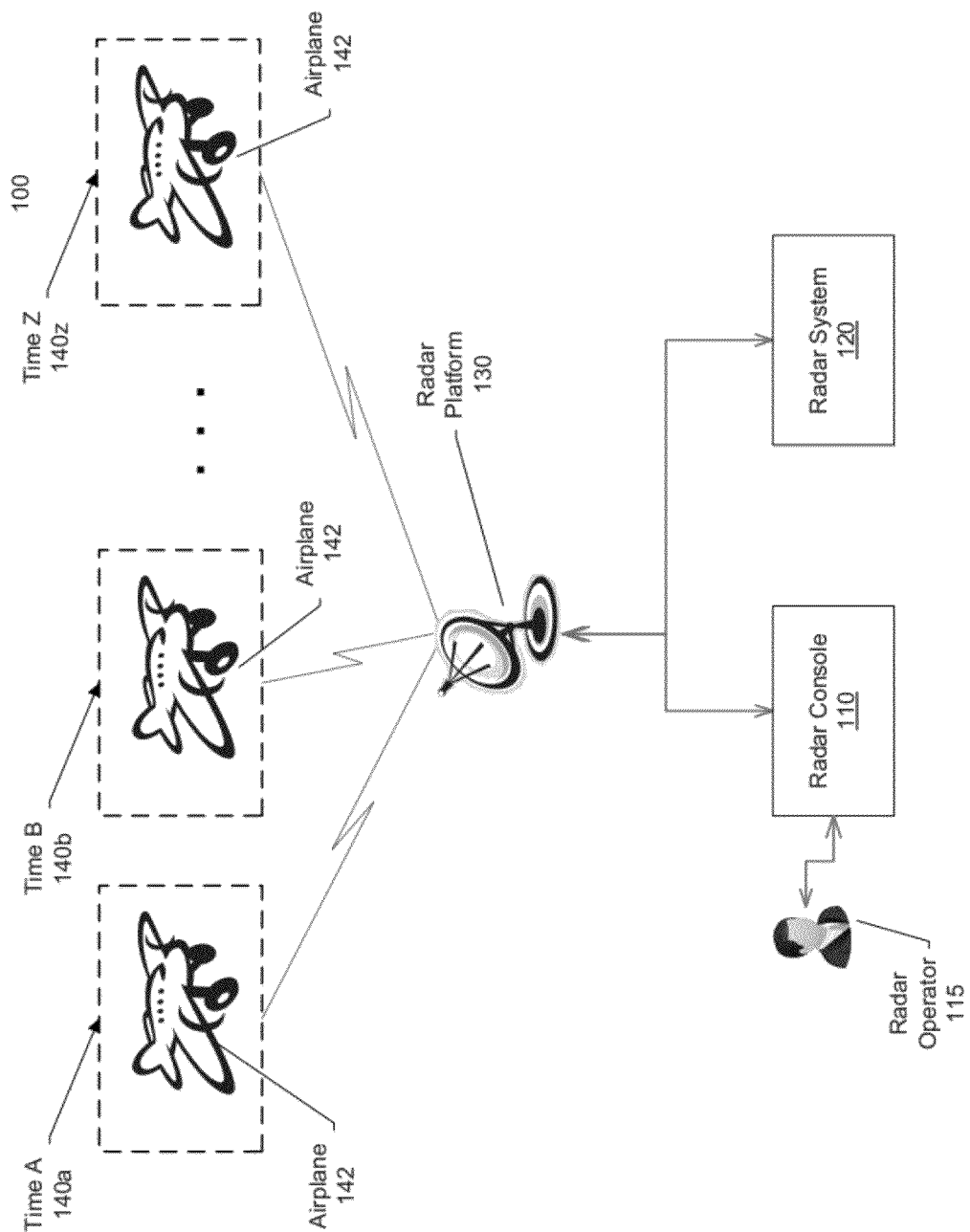
FIG. 1 is a diagram of an exemplary radar environment.

FIG. 1 is a diagram of an exemplary radar environment 100. The environment 100 includes a radar console 110, a radar system 120, and a radar platform 130. A radar operator 115 views and/or tracks an object (in this example, an airplane 142) utilizing the radar console 110. The radar system 120 tracks the airplane 142 at a plurality of times A 140a, B 140b through Z 140z. The radar platform 130 transmits and/or receives electromagnetic waves to track the object and/or a plurality of other objects (not shown). For example, the radar platform 130 transmits electromagnetic waves over a period of time and receives the reflection of the electromagnetic waves from the airplane 142 over the plurality of times A 140a, B 140b through Z 140z. The radar platform 130 communicates data (e.g., digital representation of a radar reflection of the airplane 142, processed data representation of the airplane 142, etc.) to the radar system 120.

The radar system 120 analyzes the received part or all of the received data to identify the object (e.g., the airplane 142 is a Model A32, the airplane 142 is a customized Model C52, etc.) and/or determine a confidence of the identification of the object. For example, the radar system 120 identifies the object based on the received data at times A 140a and B 140b. As another example, the radar system 120 determines a confidence weight of the identity of the object based on the received data at times A 140a, B 140b, C (not shown), and D (not shown). The radar system 120 can store the received data for further analysis and/or transmit the received data to the radar console 110 for viewing and/or analysis by the radar operator 115. Table 1 illustrates exemplary confidence levels of the identification of the object.

TABLE 1

Exemplary Confidence Levels

| True Object | Object Classification | Confidence Level |
|---|---|---|
| Airplane 142 | Model A32 | 65% |
| Airplane 142 | Model B32 | 15% |
| Airplane 142 | Model C32 | 10% |
| Airplane 142 | Model D32 | 10% |

In some examples, the plurality of times A 140a, B 140b through Z 140z are near a time (also referred to as a single look) (e.g., the plurality of times are within +10 seconds from a set time, the plurality of times are within +2 minutes of each other, etc.). The single look can be one set of received data and the one set of received data can be associated with a specified time frame (e.g., five images received every one second of a medical image, ten radar returns received every 0.01 seconds, etc.). The technology described herein can process the set of received data as a single look as described herein. In other examples, the plurality of times A 140a, B 140b through Z 140z are at different times (also referred to as multi-look) (e.g., each of the plurality of times are outside of ±10 seconds from a set time, each of the plurality of times are ±2 minutes apart from each other, etc.). The multi-look look can be multiple sets of received data, each set of received data can be a single look, and each of the multiple sets of received data can be associated with a specified time frame. The technology described herein can process the multiple sets of received data as a multi-look as described herein.

Although FIG. 1 illustrates the plurality of times A 140a, B 140b through Z 140z, the radar system 120 can utilize received data from any number of times for the identification of objects and/or the determination of the confidence of the identification of the object. Although FIG. 1 illustrates a radar platform 130, the environment 100 can utilize any number of radar platforms (e.g., ten radar platforms, one hundred radar platforms, etc.). For example, the radar system 120 can receive radar data from any number of radar platforms for the same object or different objects. In other examples, the radar camera platform 130 can include a plurality of radars and/or other types of sensor devices (e.g., motion sensor, environmental sensor, heat sensor, etc.).

Figure 2:
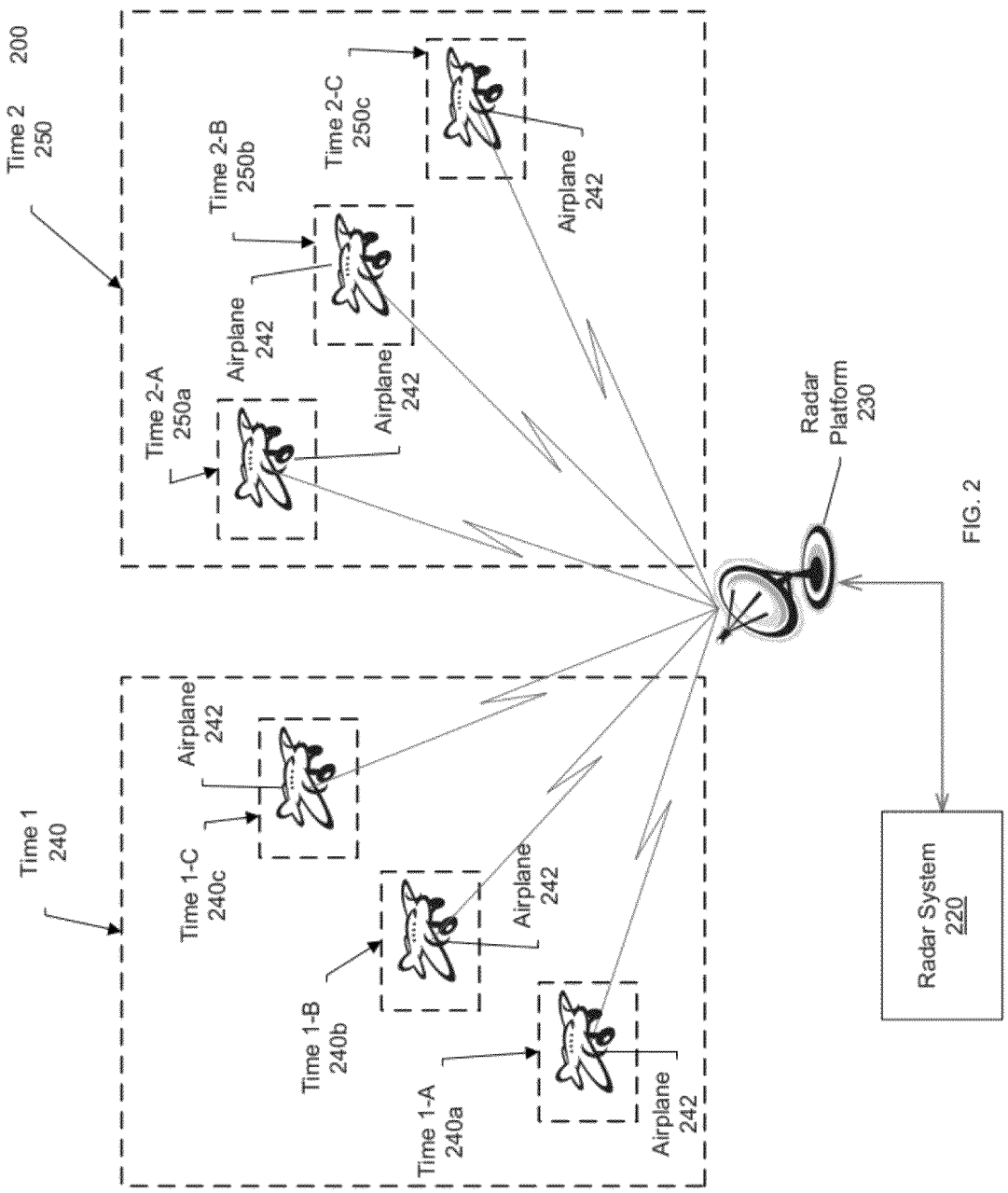
FIG. 2 is a diagram of another exemplary radar environment.

FIG. 2 is a diagram of another exemplary radar environment 200. The environment 200 illustrates radar data at two times 1 240 and time 2 250. The environment 200 includes a radar system 220 and a radar platform 230. The radar system 220 tracks an airplane 242 at a plurality of times 1-A 240a, 1-B 240b, and 1-C 240c and 2-A 250a, 2-B 250b, and 2-C 250c in each of the two times 1 240 and 2 250, respectively. The radar platform 230 transmits and/or receives electromagnetic waves to track the object and/or a plurality of other objects (not shown). For example, the radar platform 230 transmits electromagnetic waves over a period of time and receives the reflection of the electromagnetic waves from the airplane 242 over the plurality of times in each of the two times 1 240 and 2 250. The radar platform 230 communicates data (e.g., digital representation of a radar reflection of the airplane 242, processed data representation of the airplane 242, etc.) to the radar system 220.

In some examples, the plurality of times 1-A 240a, 1-B 240b, and 1-C 240c are near a time and the plurality of times 2-A 250a, 2-B 250b, and 2-C 250c are near a different time. In other examples, the times 1 240 and 2 250 are far from the same time. Table 2 illustrates exemplary times. As illustrated in Table 2, the times 1 240 and 2 250 are at different times (in this example, twenty minutes apart).

TABLE 2

Exemplary Times

| Time | Sub-Time | Clock Time |
|---|---|---|
| 1 240 | | 03:32 ± 60 seconds |
| | 1-A 240a | 03:32.21 |
| | 1-B 240b | 03:32.23 |
| | 1-C 240c | 03:32.26 |
| 2 250 | | 03:52 ± 60 seconds |
| | 2-A 250a | 03:52.32 |
| | 2-B 250b | 03:52.45 |
| | 2-C 250c | 03:52.52 |

Figure 3:
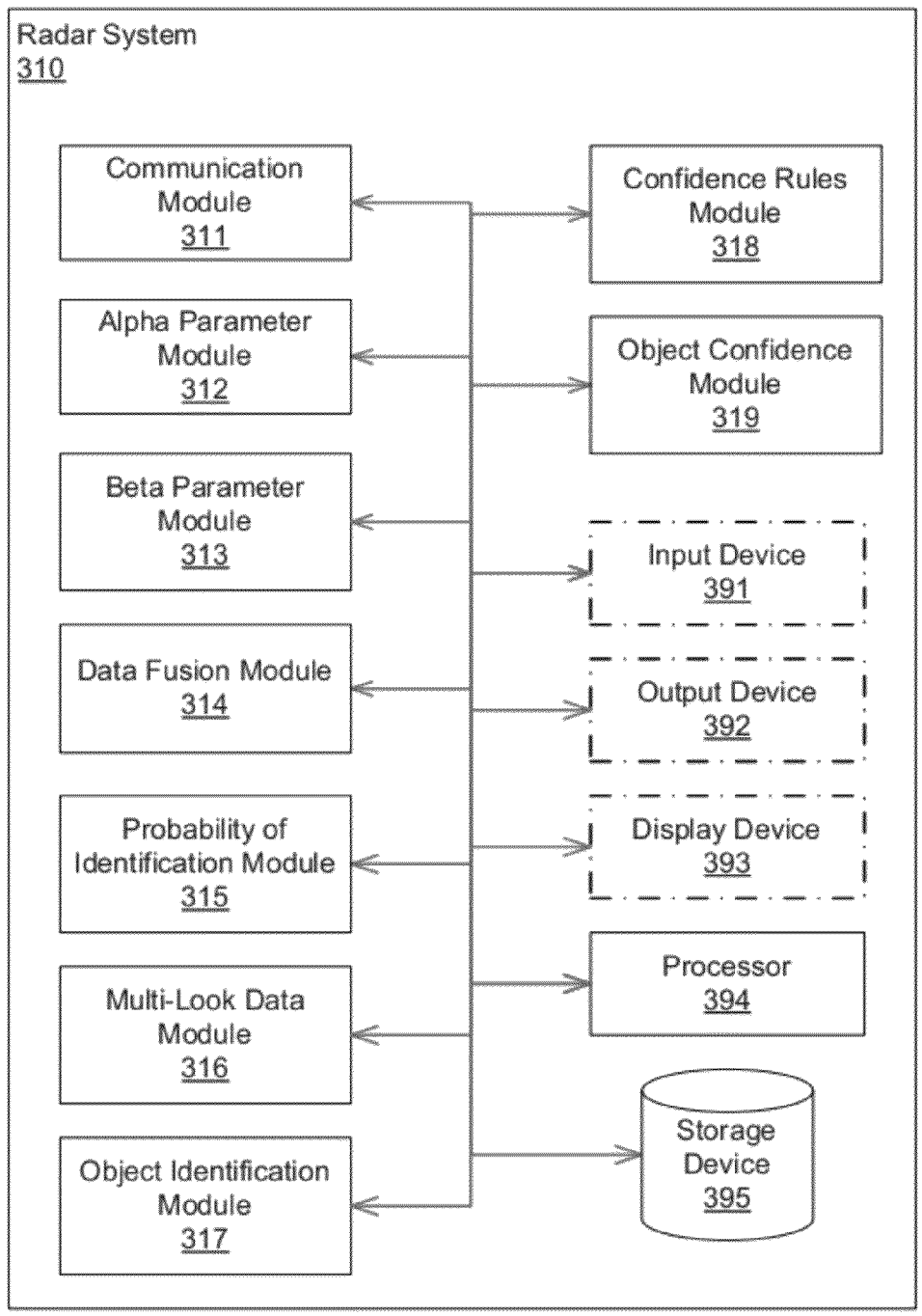
FIG. 3 is a block diagram of an exemplary radar system.

FIG. 3 is a block diagram of an exemplary radar system 310. The radar system 310 includes a communication module 311, an alpha parameter module 312, a beta parameter module 313, a data fusion module 314, a probability of identification module 315, a multi-look data module 316, an object identification module 317, a confidence rules module 318, an object confidence module 319, an input device 391, an output device 392, a display device 393, a processor 394, and a storage device 395. The modules and devices described herein can, for example, utilize the processor 394 to execute computer executable instructions and/or include a processor to execute computer executable instructions (e.g., an encryption processing unit, a field programmable gate array processing unit, etc.). It should be understood that the radar system 310 can include, for example, other modules, devices, and/or processors known in the art and/or varieties of the illustrated modules, devices, and/or processors.

The communication module 311 receives the radar data (e.g., radar signal data, from a radar platform, from an intermediate radar processing device, from a storage device, etc.). The communication module 311 communicates information to/from the radar system 310. The communication module 311 can receive, for example, information associated with a radar platform. The information associated with the radar platform can be associated with a data signal (e.g., data signal from a radar platform, processed data signal from a radar platform, data signal from a motion sensor, data signal from a global positioning system, data signal from a location system, etc.).

In some examples, the communication module 311 receives an object identification of an object (e.g., missile type HGH, letter A, vehicle type TRW, etc.). The object identification can include, for example, discrimination identification and one or more identification parameters. In other examples, the one or more identification parameters for each of the object identifications is indicative of a physical characteristic of an object associated with the object identification(s) (e.g., speed, size, height, width, etc.).

In some examples, the communication module 311 receives the set of data at a plurality of times. The plurality of times is near a time (e.g., within two minutes of a defined time, within sixty seconds of each other, etc.). In other examples, the communication module 311 receives another set of data at another plurality of times. The other plurality of times is near another time, and the time is different from the other time. In other words, the two different sets of data are from different times. In some examples, the communication module 311 receives the set of data from a plurality of data sources (e.g., radar platform, storage device, etc.).

The alpha parameter module 312 determines an alpha parameter. The alpha parameter is associated with a fusion function (e.g., quadratic mean, average, etc.). In some examples, the alpha parameter is utilized for risk-reduction by fusing posteriors of a received set of data. For example, the alpha parameter module 312 can determine the alpha parameter by optimizing classification performance using a set of training samples. The alpha parameter module 312 can, for example, select the alpha parameter from a set of alpha parameters based on the type of object for classification. For example, the alpha parameter module 312 selects an alpha parameter of zero for a medical image. As another example, the alpha parameter module 312 selects an alpha parameter of one for a financial forecast.

The beta parameter module 313 determines a beta parameter. The beta parameter is associated with a degree of expected independence of a received set of data and the received set of data includes information associated with a classification of the object. For example, the beta parameter module 313 can determine the beta parameter by optimizing the accuracy of the posterior probabilities as determined by a metric such as the negative log average (Shannon surprisal) or the mean-square average (Brier score) of a set of training samples. The beta parameter module 313 can, for example, select the beta parameter from a set of beta parameters based on the type of object for classification. For example, the beta parameter module 313 selects a beta parameter of 0.4 for a medical image. As another example, the beta parameter module 313 selects a beta parameter of zero for a financial forecast.

The data fusion module 314 fuses the received set of data based on an alpha parameter, a beta parameter, and the object confidence weight. The object confidence weight can be, for example, assigned to reflect the quality of the received set of data. In some examples, the data fusion module 314 fuses the received set of data based on a second alpha parameter, a second beta parameter, the object confidence weight, the probability of identification, and the first object identification. The second alpha parameter is associated with a fusion function and the second beta parameter is associated with a degree of expected independence of a received set of data. In other examples, the data fusion module 314 fuses the received set of data based on the alpha parameter and the beta parameter. In some examples, the data fusion module 314 fuses the received set of second data based on the alpha parameter and the beta parameter.

The probability of identification module 315 generates a probability of identification of the classification of the object based on the fused data. In some examples, the probability of identification module 315 generates a second probability of identification based on the fused data and the second fused data. In other examples, the probability of identification is indicative of the identified object being a target object (e.g., 95% probability that the object is the letter B, 76% probability that the object is a tank, etc.).

The multi-look data module 316 requests the received set of second data based on the probability of identification. In other examples, the multi-look data module 316 prioritizes a request for the received set of second data based on one or more resource parameters associated with the system. In some examples, the multi-look data module 316 prioritizes the request for the received set of second data based on the probability of identification (e.g., a low probability of identification receives a higher priority level, a high probability of identification receives a lower priority level, etc.). In other examples, the multi-look data module 316 determines whether to make additional looks based on the probability of identification (e.g., probability is greater than 0.8, one more additional look; probability is less than 0.6, three more additional looks; etc.).

The object identification module 317 generates an object identification based on the first discrimination identification, the second discrimination identification, and the probability of identification. In some examples, the object identification module 317 generates a second object identification of the object based on a received set of data. The second object identification includes second discrimination identification and one or more second identification parameters.

The confidence rules module 318 selects at least one confidence rule from a plurality of confidence rules based on the first discrimination identification and the second discrimination identification.

The object confidence module 319 generates an object confidence weight based on the one or more first identification parameters, the one or more second identification parameters, and the selected at least one confidence rule. In some examples, the confidence rules module 319 generates the plurality of confidence rules based on the first object identification, the second object identification, and/or one or more pre-defined relationships between the first object identification and the second object identification. In other examples, the object confidence weight is indicative of the discrimination identification for each of the object identification accurately identifying an object associated with the first object identification and the second object identification.

The input device 391 receives information associated with the radar system 310 (e.g., instructions from a user, instructions from another computing device, etc.) from a user (not shown) and/or another computing system (not shown). The input device 391 can include, for example, a keyboard, a scanner, etc. The output device 392 outputs information associated with the radar system 310 (e.g., information to a printer (not shown), information to a speaker, etc.).

The display device 393 displays information associated with the radar system 310 (e.g., status information, configuration information, etc.). In some examples, the display device 393 displays the probability of identification of the classification of the object and/or any other information associated with the radar system 310 to an operator. The processor 394 executes the operating system and/or any other computer executable instructions for the radar system 310 (e.g., executes applications, etc.).

The storage device 395 stores the received data (e.g., actual radar data, processed radar data, etc.), the identifications, and/or any other data associated with the radar system 310. The storage device 395 can store image information and/or any other data associated with the radar system 310. The storage device 395 can include a plurality of storage devices and/or the radar system 310 can include a plurality of storage devices (e.g., a radar storage device, an identification storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage. In some examples, the storage device 395 includes a confidence rules storage module. The confidence rules storage module stores the plurality of confidence rules. The plurality of confidence rules can be, for example, pre-defined and/or modifiable.

Figure 4:
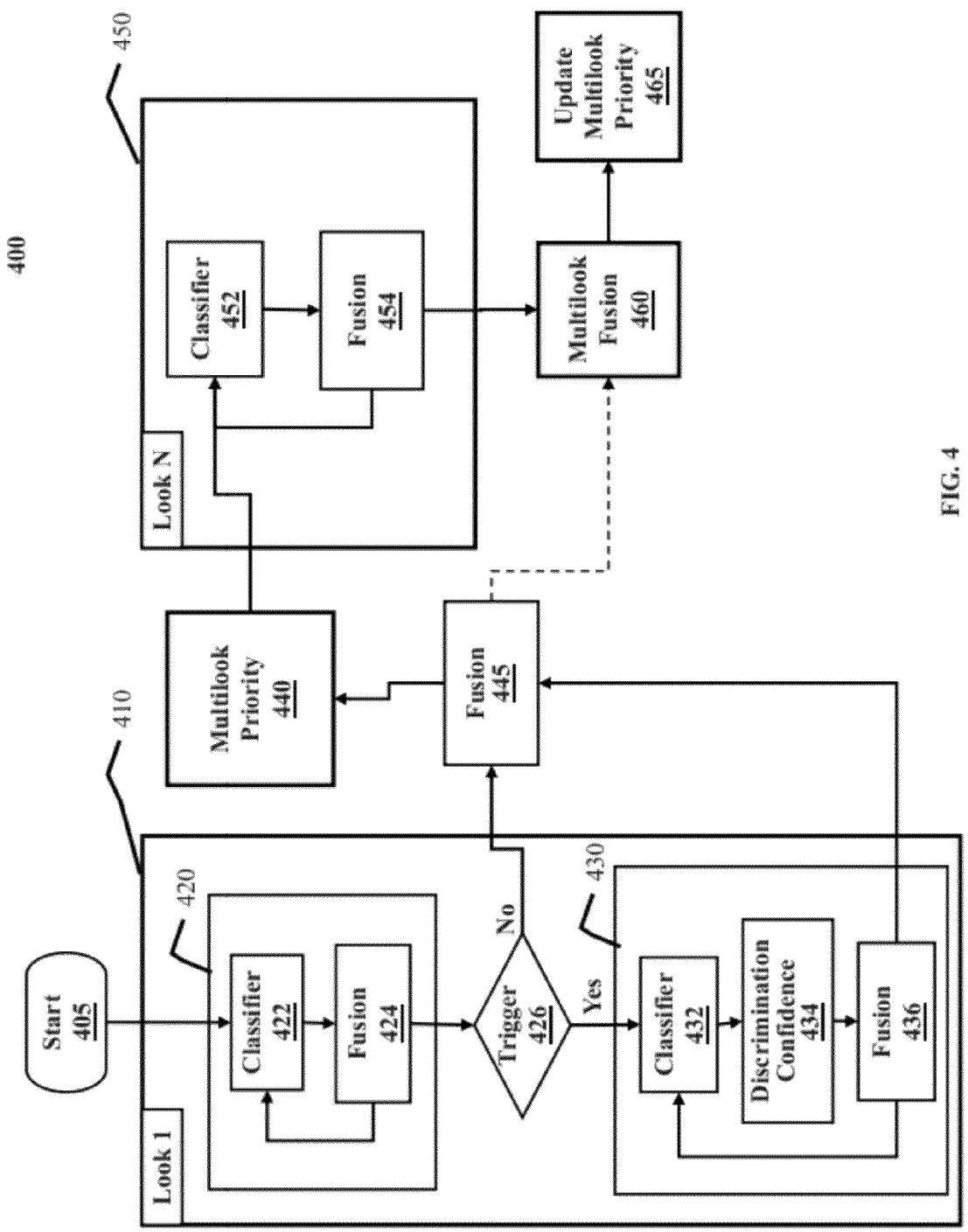
FIG. 4 is a flowchart of an exemplary radar process.

FIG. 4 is a flowchart of an exemplary radar process 400 utilizing, for example, the radar system 120 of FIG. 1. The process 400 includes a first look 410 at a set of first data (e.g., at or near a first time, within a first time frame, etc.) and additional looks 450 at a set of second data (e.g., at a different time frame from the set of first data, etc.). The process starts 405 at an object identification process 420 in the first look 410 of the set of first data. The radar system 120 generates 422 a classification of the object based on the set of first data (e.g., classification based on the shape and speed that the object is a tank, classification based on the size and shape that the object is a missile type GF, classification based on the shape and boundaries that the object is a letter A, etc.). The radar system 120 fuses 424 the set of first data based on an alpha parameter and a beta parameter and generates a probability of identification of the object based on the fused data. Based on the probability of identification, the radar system 120 can re-classify 422 the set of first data (e.g., the probability of identification is less than 60% probability, the probability of identification is between 70-79% probability, etc.). The radar system 120 determines if additional processing is required based on the probability of identification and/or any other parameters associated with the process 400 and triggers 426 a confidence determination process 430 (also referred to as the confidence logic process) or continues to another fusion process.

In the confidence determination process 430 in the first look 410, the radar system 120 generates 432 a classification of the object based on the set of first data. The classification generation 422 in the object identification process 420 can be the same or different from the classification generation 432 in the confidence determination process 430 (e.g., same classification technique with different parameters, different classification techniques with the same parameters, etc.). The classification generation 422 in the object identification process 420 can be based on the same or different set of data as the classification generation 432 in the confidence determination process 430. The radar system 120 selects one or more confidence rules based on the classification generations 422 and 432 and/or information associated with each classification. The radar system 120 generates 434 an object confidence weight (also referred to as an object confidence score) based on the based on the classification generations 422 and 432, information associated with each classification, and/or the one or more confidence rules. The radar system 120 fuses 424 the set of first data based on an alpha parameter, a beta parameter, and the object confidence weight and generates a probability of identification of the object based on the fused data. Based on the probability of identification, the radar system 120 can re-classify 432 the set of first data.

The radar system 120 fuses 445 the received data from the first look 410 based on an alpha parameter and a beta parameter. The radar system 120 prioritizes 440 the additional looks 450 (also referred to as multi-look priority) based on one or more resource parameters associated with the radar system 120 (e.g., processor availability, memory availability, power availability, etc.). Table 3 illustrates exemplary prioritization of the additional looks for a plurality of objects.

TABLE 3

Exemplary Prioritization

| Object Identifier | Classification | Criteria | Processor Availability | Prioritization |
|---|---|---|---|---|
| A332 | Tank | Low if Processor Availability below 80% | 5% | Low |
| B322 | Missile | High—No Exceptions | 5% | High |
| C322 | Airplane | Medium if Processor Availability below 40% | 5% | Medium |

In the additional looks 450, the radar system 120 generates 452 a classification of the object based on a set of third data. The set of third data is associated with a time that is different from the set of data analyzed in the first look 410. For example, the set of data analyzed in the additional looks 450 is collected between 03:32.21 and 03:33.21 and the set of data analyzed in the first look 410 is collected between 03:12.53 and 03:13.43. The radar system 120 fuses 454 the set of third data based on an alpha parameter and a beta parameter and generates a probability of identification of the object based on the fused data. Based on the probability of identification, the radar system 120 can re-classify 452 the set of third data.

The radar system 120 fuses 460 the data from the first look 410 and any subsequent additional looks 450 based on an alpha parameter and a beta parameter and generates a probability of identification of the object based on the fused data. The radar system 120 updates 465 the multi-look priority based on the processing in the additional looks 450. Table 4 illustrates exemplary identifications and probabilities of identification through the process 400 for an object. As illustrated in Table 4, the final output of the radar system 120 to the operator and/or any other system is that the object is Missile Type TR4E with a 99% probability of a correct classification.

TABLE 4

Exemplary Identification and Probabilities

| Process | Classification | Probability of Identification |
|---|---|---|
| Object Identification Process 420 | Missile Type TR4 | 75% |
| Confidence Determination Process 430 | Missile Type TR4E | 95% |
| Additional Looks Process 450 | Missile Type TR4E | 97% |
| Multi-look Fusion 460 | Missile Type TR4E | 99% |

In some examples, the alpha parameters and/or the beta parameters utilized in the process 400 are the same. In other examples, the alpha parameters and/or the beta parameters utilizing the process 400 are different. Table 5 illustrates exemplary alpha and beta parameters. Table 6 illustrates exemplary alpha parameters, beta parameter, and weights.

TABLE 5

Exemplary Alpha and Beta Parameters

| Alpha ($\alpha$) | Beta ($\beta$) | Description |
|---|---|---|
| 0.0 | 1.0 | Naïve-Bayes |
| 0.0 | 0.0 | Log-Averaging |
| 1.0 | 0.0 | Averaging |
| −1.0 | 0.0 | Renormalized Harmonic Mean |
| 2 | 0 | Renormalized Quadratic Mean |
| $\infty$ | 0 | Renormalized Maximum Class Probabilities |

TABLE 6

Exemplary Alpha Parameters, Beta Parameters, and Weights

| Fusion | Alpha ($\alpha$) | Beta ($\beta$) | Weight |
|---|---|---|---|
| Fusion 424 | 0.4 | 0.6 | 1.0 |
| Fusion 436 | 0.0 | 1.0 | Object Confidence Weight (in this example, 2.0) |
| Fusion 445 | 0.6 | 0.4 | 1.0 |
| Fusion 454 | 1.0 | 0.0 | 1.0 |
| Multilook Fusion 460 | 0.0 | 1.0 | 1.0 |

Figure 5A:
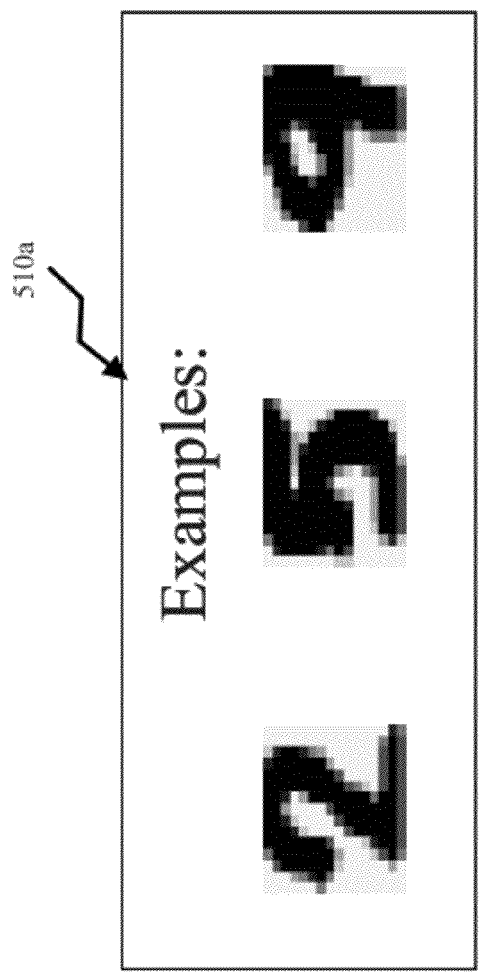
FIG. 5A illustrates exemplary numbers for identification.

FIG. 5A illustrates exemplary numbers 510a for identification. The radar system 120 of FIG. 1 can analyze the number 510a and determine a classification and a probability of identification utilizing the technology described herein. For example, the radar system 120 determines a classification of the numbers "259" with a probability of 98%.

Figure 5B:
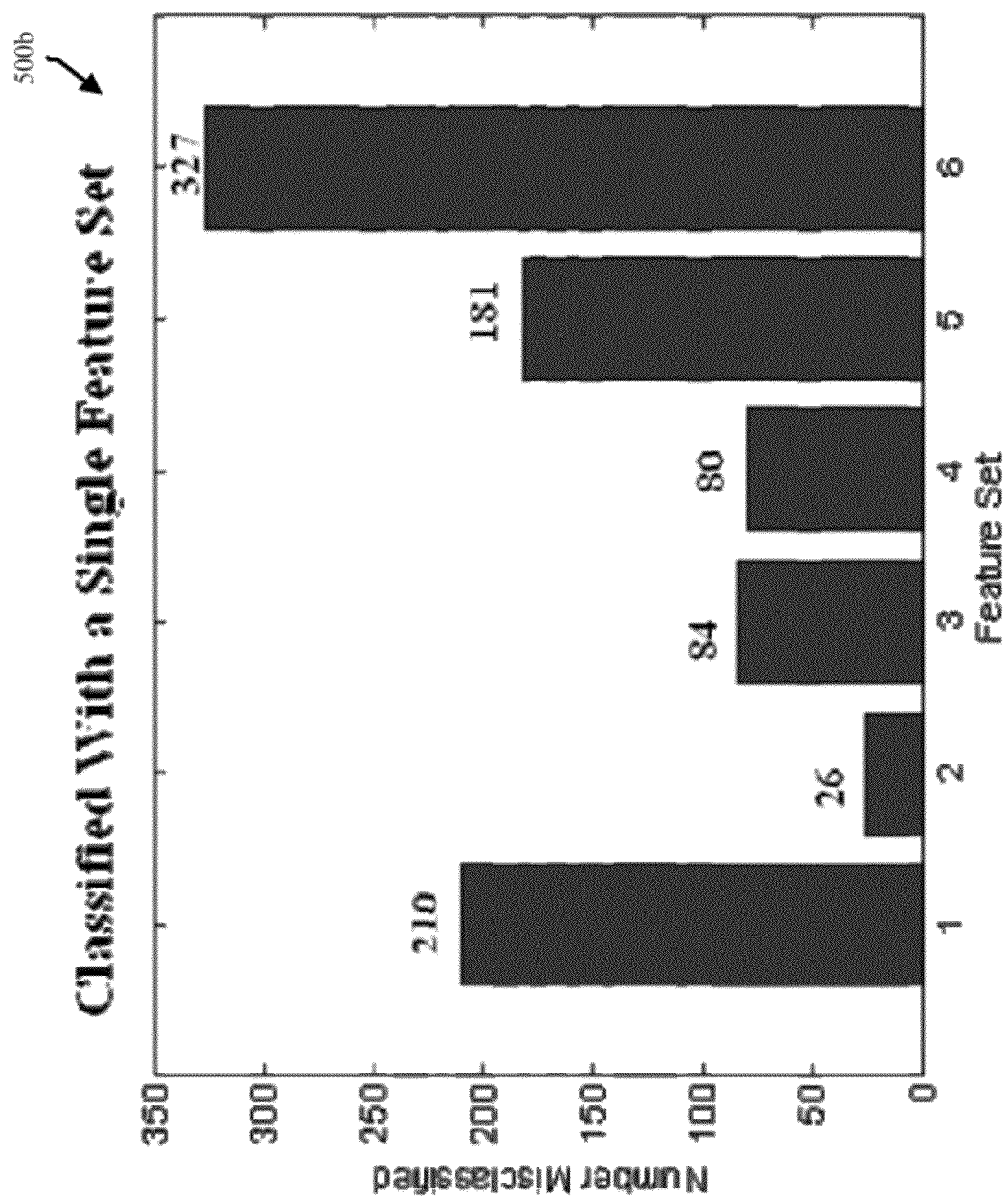
FIGS. 5B and 5C illustrate classification performance of the exemplary numbers of FIG. 5A.
Figure 5C:
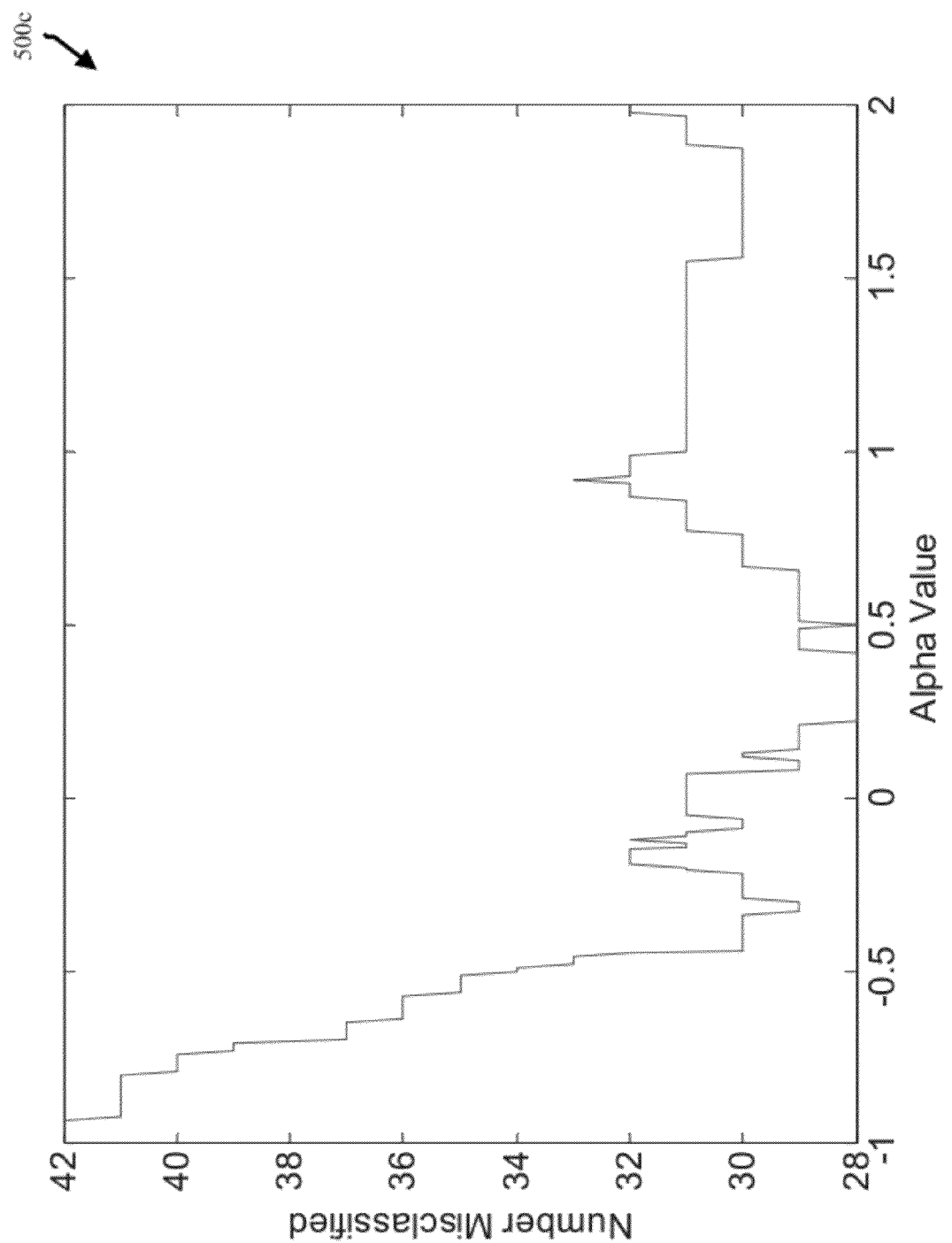

FIGS. 5B and 5C illustrate classification performance of the exemplary numbers 510a of FIG. 5A. FIG. 5B illustrates a chart 500b of classification performance using one to six feature sets (also referred to as sets of data). FIG. 5C illustrates a chart 500c of classification performance utilizing various alpha parameters. In this example, the performance of the six feature sets varies from 26 misclassifications for set 2 to 327 misclassifications for set 6, and the positive values of alpha act as smoothing filters relative to the log-average or equivalently the geometric mean at $\alpha=0$. The best performance in this example is achieved with $\alpha=0.25$ and negative values of alpha accentuate differences, which beyond $\alpha<-0.5$ significantly degrades the classification performance. In this example, the beta parameter which models the degree of expected independence and is not influential on the classification performance.

Figure 6A:
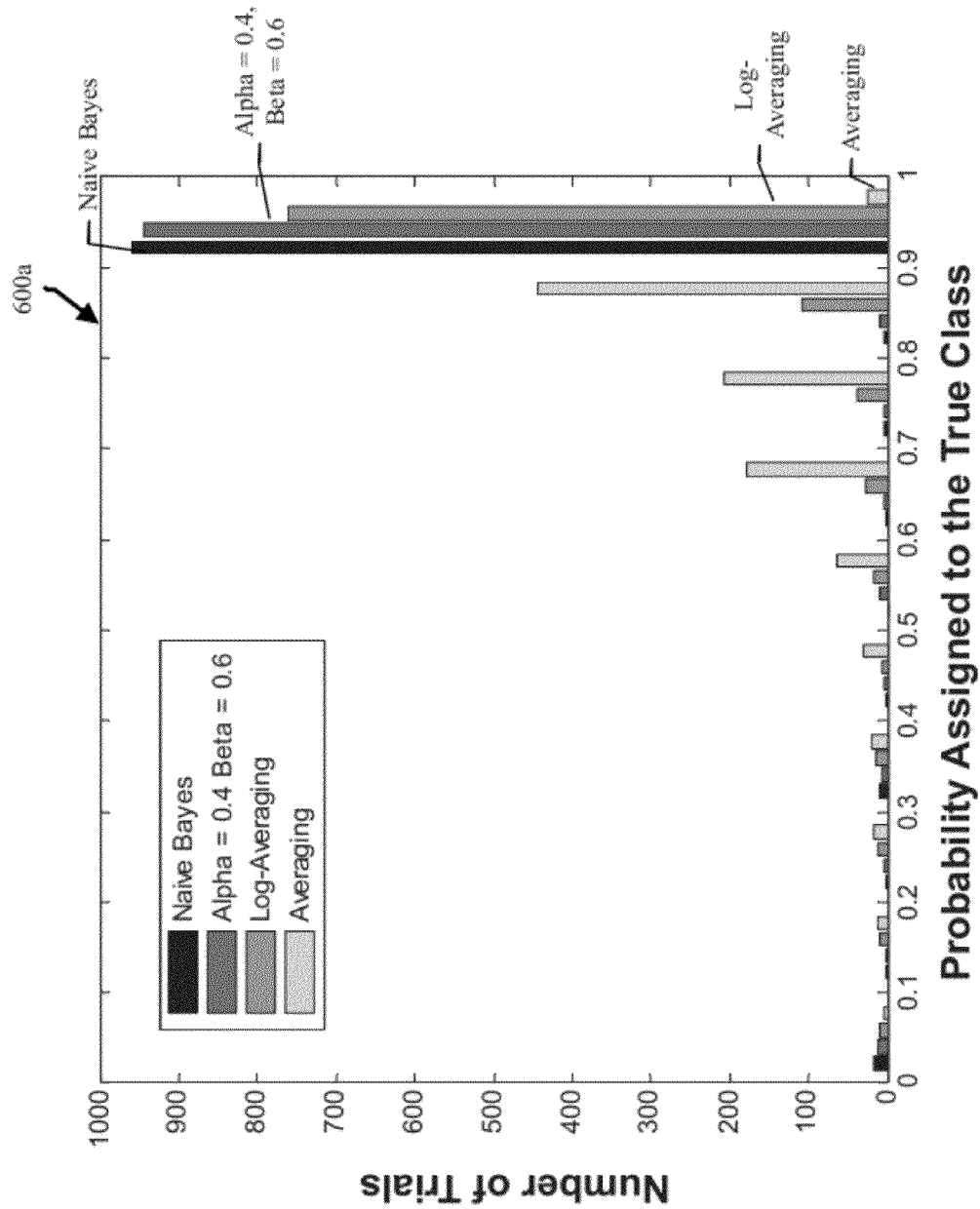
FIG. 6A illustrates a histogram of probability outputs for the fusion method.

FIG. 6A illustrates a histogram 600a of probability outputs for the fusion method optimized against the Shannon surprisal ($\alpha=0.4$, $\beta=0.6$) and shows three common fusion methods; naïve-Bayes ($\alpha=0$, $\beta=1$) which assumes independence between the inputs; log-averaging ($\alpha=0,\beta=0$), which assumes the inputs are correlated, but does not smooth errors; and averaging ($\alpha=1,\beta=0$), which assumes both correlation and error in the inputs.

Figure 6B:
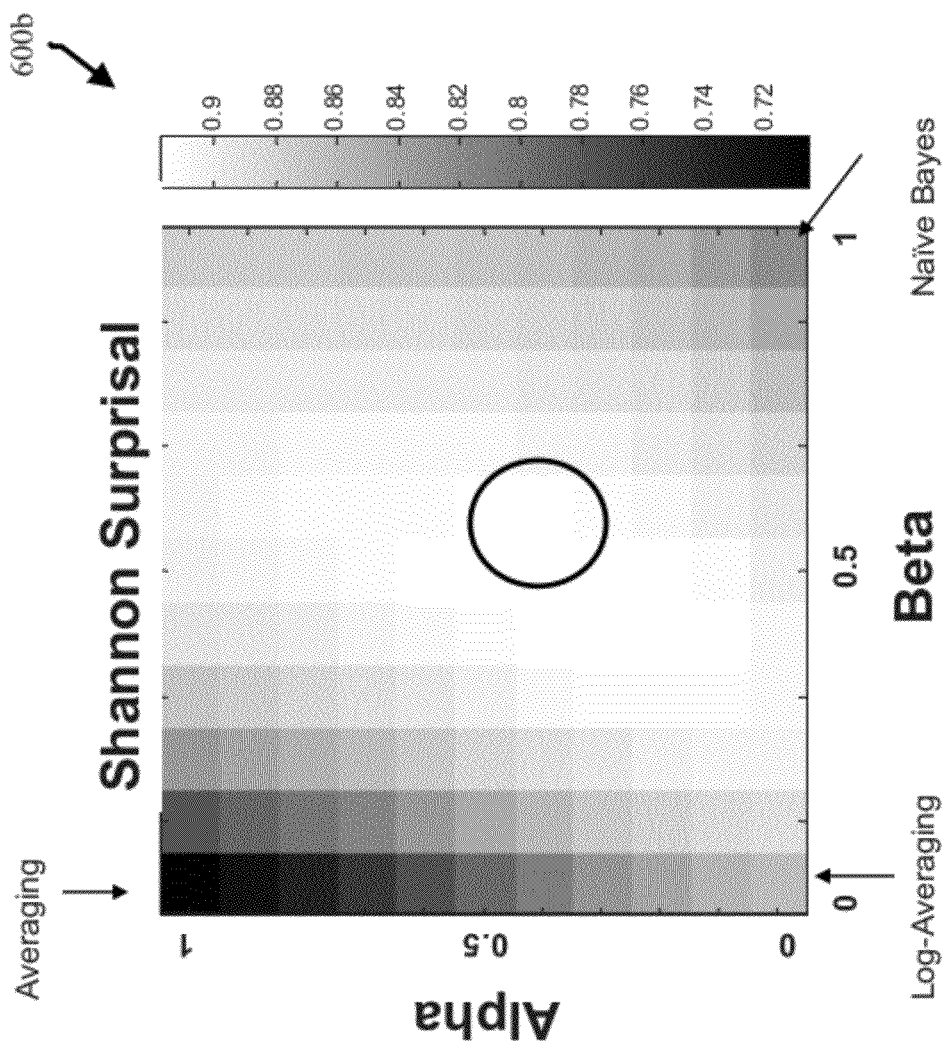
FIG. 6B illustrates a diagram of the performance of the fusion method against effective probabilities based on the cost-function for Shannon surprisal.

FIG. 6B illustrates a diagram 600b of the performance of the fusion method against effective probabilities based on the cost-function for Shannon surprisal. The circle indicates the region of optimal performance. The determination of the alpha parameter and/or the beta parameter can be, for example, based on one of these probabilities and/or or a combination of requirements. For Shannon surprisal the optimal value is ($\alpha=0.4,\beta=0.6$).

In other examples, an optimal value for the alpha parameter and/or an optimal value for the beta parameter are determined using a configuration process (also referred to as a training process). FIG. 6B illustrates an output of an exemplary configuration process utilizing a tool such a Shannon Surprisal to find the optimal values for the alpha parameter and the beta parameter. The configuration process can use a large set of training data for a test of the technology. The training data can be utilized to determine the optimal values. The training data can be, for example, collected from a true object and/or created based on a model of a true object.

For example, various simulations utilizing a plurality of static values for the alpha parameter and the beta parameter for each data input in the training data. In this example, for each of these possible technology configurations (i.e., alpha-beta pairs), the technology is analyzed against metrics (e.g., Shannon Surprisal, Brier score, etc.) to determine the optimal set of the alpha parameters and/or the beta parameters for the technology configuration.

Figure 7:
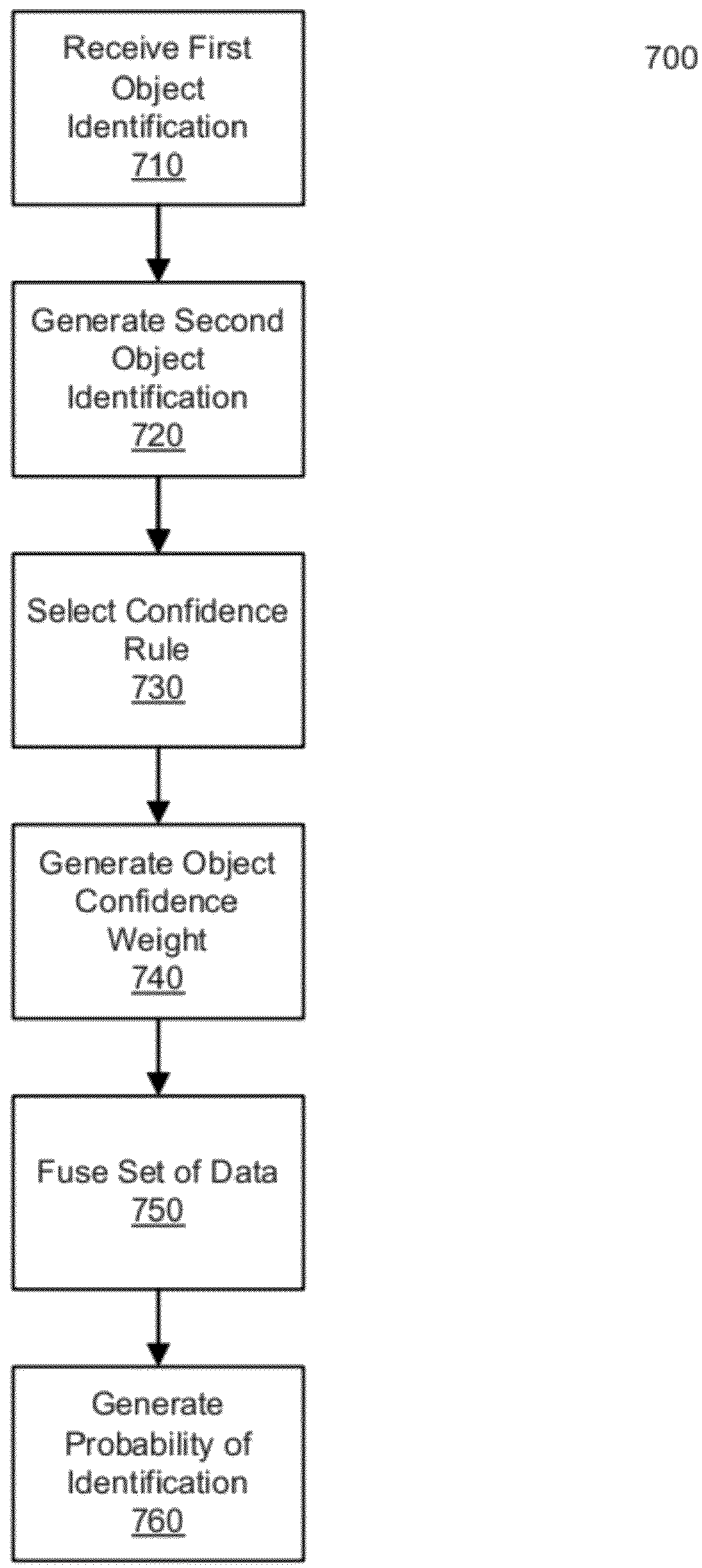
FIG. 7 is a flowchart of another exemplary confidence determination for an object identification.

FIG. 7 is a flowchart of an exemplary confidence determination for an object identification process 700 utilizing, for example, the radar system 310 of FIG. 3. The communication module 311 receives (710) a first object identification of a classification of an object (e.g., car, truck, minivan, etc.). The first object identification includes first discrimination identification (e.g., car, truck, missile, tank, letter, number, etc.) and one or more first identification parameters (e.g., tire size, speed, height, size, contrast, etc.). The object identification module 317 generates (720) a second object identification of the object based on a received set of data. The second object identification includes second discrimination identification and one or more second identification parameters. The confidence rules module 318 selects (730) at least one confidence rule from a plurality of confidence rules based on the first discrimination identification and the second discrimination identification. The object confidence module 319 generates (740) an object confidence weight based on the one or more first identification parameters, the one or more second identification parameters, and the selected at least one confidence rule. The object confidence module 319 can generate (740) the object confidence weight based on the at least one confidence rule concurrently and/or sequentially (e.g., each rule is applied one after another, each rule is applied at the same time, etc.). The data fusion module 314 fuses (750) the received set of data based on an alpha parameter, a beta parameter, and the object confidence weight. The probability of identification module 315 generates (760) a probability of identification of the object based on the fused data.

Table 7 illustrates exemplary confidence rules.

TABLE 7

Exemplary Confidence Rules

|  |  | First Discrimination Identification | | |
|---|---|---|---|---|
|  |  | Car | Truck | Minivan |
| Second Discrimination Identification | Car | Confidence = 1 | Confidence = 1 | If # of Passengers > 2, Confidence = 0 Elseif Speed > 55 MPH and Speed < 70 MPH, Confidence = 0 Elseif Speed > 70 MPH, Confidence = 1 |
|  | Truck | If # of Passengers > 2, Confidence = 0 Elseif Tire Size > 30" and Speed < 55 MPH, Confidence = 1 | Confidence = 1 | Confidence = 1 |
|  | Minivan | If # of Passengers > 4, Confidence = 1 Elseif Height < 1.5 meters, Confidence = 0 | Confidence = 1 | Confidence = 1 |

In some examples, the data fusion module 314 fuses the received set of data based on a second alpha parameter, a second beta parameter, the object confidence weight, the probability of identification, and the first object identification. The second alpha parameter is associated with a fusion function, the second beta parameter is associated with a degree of expected independence of a received set of data, and the received set of data includes information associated with the classification of the object.

In other examples, the object identification module 317 generates an object identification based on the one or more first identification parameters, the one or more second identification parameters, and the selected at least one confidence rule. In some examples, the confidence rules module 318 generates the plurality of confidence rules based on the first object identification, the second object identification, and/or one or more pre-defined relationships between the first object identification and the second object identification (e.g., a truck only has two seats, a car has no maximum speed limit, but a cargo van does have a maximum speed limit, etc.).

In other examples, the object identification module 317 generating the first object identification based on a first discrimination function and generating the second object identification based on a second discrimination function. In some examples, the object confidence weight is indicative of the discrimination identification for each of the object identification accurately identifying an object associated with the first object identification and the second object identification. In other examples, the object confidence weight can be used to ignore either the first object identification or the second object identification if one of the classification results is pre-determined to be associated with a part of the process (e.g., known weak part of the algorithm) and/or if the process is pre-determined to have difficulties identifying a particular classification.

Figure 8:
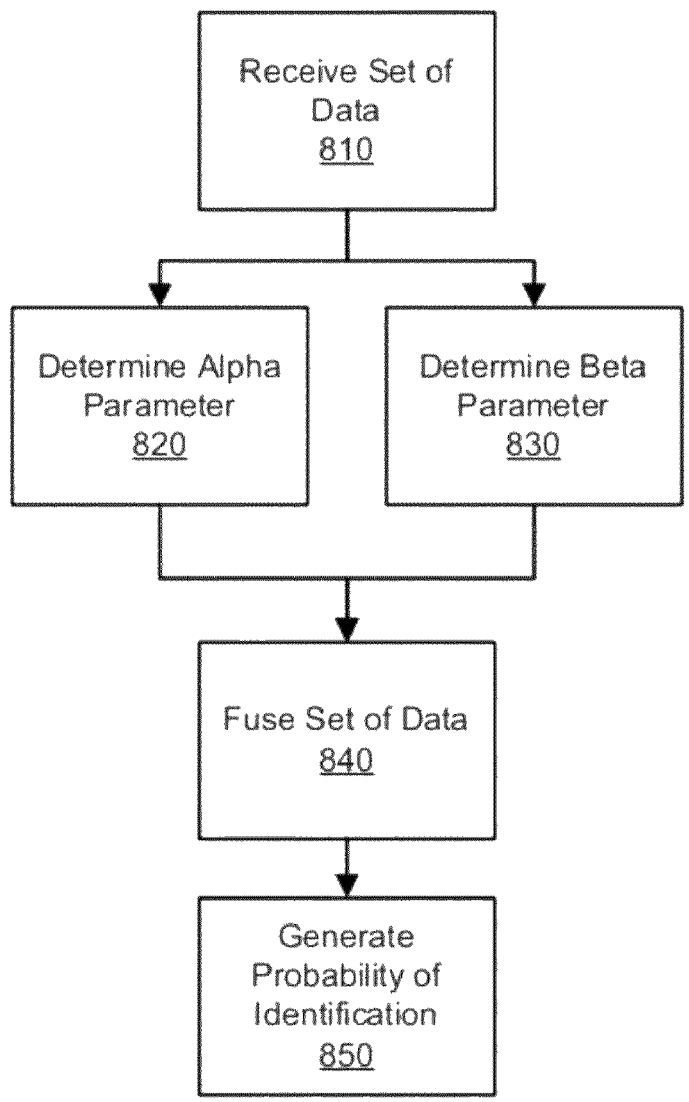
FIG. 8 is a flowchart of exemplary identification of an object process.

FIG. 8 is a flowchart of an exemplary identification of an object process 800 utilizing, for example, the radar system 310 of FIG. 3. The communication module 311 receives (810) the set of data at a plurality of times. The alpha parameter module 312 determines (820) an alpha parameter. The beta parameter module 313 determines (830) a beta parameter. The data fusion module 314 fuses (840) the received set of data based on the alpha parameter and the beta parameter. The probability of identification module 315 generates (850) a probability of identification of the classification of the object based on the fused data.

In some examples, the alpha parameter module 312 selects the fusion function based on the alpha parameter and the beta parameter. For example, the alpha parameter module 312 configures a pre-defined function using the alpha parameter and the beta parameter to initialize the function. The fusion function can be characteristic of, for example, quadratic mean function, an average function, a log-average function, a harmonic mean function, or an independent product rule function.

In other examples, the alpha parameter module 312 extrapolates and/or interpolates the fusion function based on the alpha parameter and the beta parameter to determine a processing technique (e.g., a processing technique beyond those described in Table 5). In some examples, the alpha parameter and/or the beta parameter can be any real number.

In other examples, the alpha parameter and/or the beta parameter initialize the fusion function. In other words, in these examples, the different values of the alpha parameter and the beta parameter produce different fusion functions. For example, pairs of the alpha parameter and the beta parameter reproduce known fusion techniques as listed in Table 5 above. In some examples, the alpha parameter module 312 and/or the beta parameter module 313 select the alpha parameter and/or the beta parameter, respectively, based on the application of the technology (e.g., missile tracking, airplane tracking, image analysis, etc.). In other examples, the alpha parameter and/or the beta parameter are pre-defined for an implementation of the technology based on the specified application of the implementation. For example, if the technology is only used for medical image analysis, the alpha parameter and/or the beta parameter are pre-defined and not changed during operation. In some examples, the alpha parameter and/or the beta parameter are determined at the run-time of the technology.

In other examples, the received set of data includes a plurality of object classification probabilities. The plurality of object classification probabilities includes information associated with the object at a plurality of sequential times (e.g., radar data tracking a missiles flight trajectory, radar data tracking an airplanes flight trajectory, etc.). In some examples, the data fusion module 314 fuses the plurality of object classification probabilities based on the alpha parameter and the beta parameter.

In other examples, the number of object classes is the number of object classifications that can be identified (e.g., ten classes with numbers 0-9, twenty-six classes with letters A-Z, etc.).

In some examples, the fused data is calculated in accordance with equation:

If any $|\alpha_i| < TOL$ $$\text{If } \sum_{j=1}^{N} w_j < 1$$

$$W_i = 1$$

else $$W_i = \left[\sum_{j=1}^{N} w_j\right]^{\beta_i - 1}$$

$$P(\omega_i | x_1, x_2, \ldots, x_N) = \frac{P(\omega_i)\left(\prod_{j=1}^{N} P(\omega_i | x_j)^{w_j}\right)^{w_i}}{\sum_{k=1}^{C}\left[P(\omega_k)\left(\prod_{j=1}^{N} P(\omega_i | x_j)^{w_j}\right)^{w_k}\right]}$$

else $$V = \sum_{j=1}^{N} w_j$$

$$\text{If } \sum_{j=1}^{N} w_j < 1$$

$$W_i = V$$

else $$W_i = V^{\beta_i}$$

$$P(\omega_i | x_1, x_2, \ldots, x_N) = \frac{P(\omega_i)\left(\frac{1}{V}\sum_{j=1}^{N} w_j P(\omega_i | x_j)^{\alpha_i}\right)^{\frac{w_i}{\alpha_i}}}{\sum_{k=1}^{C}\left[P(\omega_k)\left(\frac{1}{V}\sum_{j=1}^{N} w_j P(\omega_k | x_j)^{\alpha_k}\right)^{\frac{w_k}{\alpha_k}}\right]}$$

whereas
$x_i$=Individual classifier execution to be combined
$P(\omega_i)$=Prior probability of the $i^{th}$ class
$P(\omega_i | x_j)$=Posterior probability of the $i^{th}$ class for the $j^{th}$ classifier execution, created without the use of prior probabilities
$P(\omega_i | x_1, \ldots, x_N)$=Posterior probability of the $i^{th}$ class after fusing classifier executions 1 through N
N=Number of classifier executions
C=Number of object classes
$\alpha_i, \beta_i$=Input parameters that determine the type of combining, specified per class
$w_j$=Weight associated with the $j^{th}$ classifier execution, default value=1 TOL=tolerance The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for identifying an object, the system comprising:
    an alpha parameter module configured to determine an alpha parameter, the alpha parameter associated with a fusion function;
    a beta parameter module configured to determine a beta parameter, the beta parameter associated with a degree of expected independence of a received set of data and the received set of data comprising information associated with a classification of the object;
    a data fusion module configured to fuse the received set of data based on the alpha parameter and the beta parameter; and
    a probability of identification module configured to generate a probability of identification of the classification of the object based on the fused data.

2. The system of claim 1, further comprising a communication module configured to receive the set of data at a plurality of times, the plurality of times being near a time.

3. The system of claim 2, further comprising:
    the communication module further configured to receive a set of second data at a second plurality of times, the second plurality of times being near a second time, and the time being different from the second time;
    the data fusion module further configured to fuse the received set of second data based on the alpha parameter and the beta parameter; and
    the probability of identification module further configured to generate a second probability of identification based on the fused data and the second fused data.

4. The system of claim 3, further comprising a multi-look data module configured to request the received set of second data based on the probability of identification.

5. The system of claim 3, further comprising a multi-look data module configured to prioritize a request for the received set of second data based on one or more resource parameters associated with the system.

6. The system of claim 1, wherein the probability of identification is indicative of the identified object being a target object.

7. The system of claim 1, wherein the received set of data comprising radar signal data.

8. The system of claim 1, further comprising a communication module configured to receive the set of data from a plurality of data sources.

9. The system of claim 1, wherein the fused data is calculated in accordance with equation:

If any $|\alpha_i| < TOL$

If $\sum_{j=1}^{N} w_j < 1$ $w_i = 1$ else $$W_i = \left[\sum_{j=1}^{N} w_j\right]^{\beta_i - 1}$$

$$P(\omega_i | x_1, x_2, \ldots, x_N) = \frac{P(\omega_i)\left(\prod_{j=1}^{N} P(\omega_i | x_j)^{w_j}\right)^{W_i}}{\sum_{k=1}^{C}\left[P(\omega_k)\left(\prod_{j=1}^{N} P(\omega_i | x_j)^{w_j}\right)^{W_k}\right]}$$

else $$V = \sum_{j=1}^{N} w_j$$

$$\text{If } \sum_{j=1}^{N} w_j < 1$$

$$W_i = V$$

else $$W_i = V^{\beta_i}$$

$$P(\omega_i | x_1, x_2, \ldots, x_N) = \frac{P(\omega_i)\left(\frac{1}{V}\sum_{j=1}^{N} w_j P(\omega_i | x_j)^{\alpha_i}\right)^{\frac{W_i}{\alpha_i}}}{\sum_{k=1}^{C}\left[P(\omega_k)\left(\frac{1}{V}\sum_{j=1}^{N} w_j P(\omega_k | x_j)^{\alpha_k}\right)^{\frac{W_k}{\alpha_k}}\right]}$$

whereas
$x_i$=Individual classifier execution to be combined
$P(\omega_i)$=Prior probability of the $i^{th}$ class
$P(\omega_i|x_j)$=Posterior probability of the $i^{th}$ class for the $j^{th}$ classifier execution, created without the use of prior probabilities
$P(\omega_i|x_1, \ldots, x_N)$=Posterior probability of the $i^{th}$ class after fusing classifier executions 1 through N
N=Number of classifier executions
C=Number of object classes
$\alpha_i, \beta_i$=Input parameters that determine the type of combining, specified per class
$w_j$=Weight associated with the $j^{th}$ classifier execution, default value=1 TOL=tolerance.

10. A method, implemented on a processor, for identifying an object, the method comprising:
   determining an alpha parameter, the alpha parameter associated with a fusion function;
   determining a beta parameter, the beta parameter associated with a degree of expected independence of a received set of data and the received set of data comprising information associated with a classification of the object;
   fusing the received set of data based on the alpha parameter and the beta parameter; and
   generating a probability of identification of the classification of the object based on the fused data.

11. The method of claim 10, further comprising selecting the fusion function based on the alpha parameter and the beta parameter.

12. The method of claim 11, wherein the fusion function is a quadratic mean function, an average function, a log-average function, a harmonic mean function, or an independent product rule function.

13. The method of claim 11, the method further comprising extrapolating the fusion function based on the alpha parameter and the beta parameter.

14. The method of claim 11, the method further comprising interpolating the fusion function based on the alpha parameter and the beta parameter.

15. The method of claim 10, wherein the received set of data comprising a plurality of object classification probabilities, the plurality of object classification probabilities comprising information associated with the object at a plurality of sequential times, and
   the fusing the received set of data based on the alpha parameter and the beta parameter further comprising fusing the plurality of object classification probabilities based on the alpha parameter and the beta parameter.

16. The method of claim 10, wherein the fused data is calculated in accordance with equation:

If any $|\alpha_i| < TOL$ $$\text{If } \sum_{j=1}^{N} w_j < 1$$

$$W_i = 1$$

else $$W_i = \left[\sum_{j=1}^{N} w_j\right]^{\beta_i - 1}$$

$$P(\omega_i | x_1, x_2, \ldots, x_N) = \frac{P(\omega_i)\left(\prod_{j=1}^{N} P(\omega_i | x_j)^{w_j}\right)^{W_i}}{\sum_{k=1}^{C}\left[P(\omega_k)\left(\prod_{j=1}^{N} P(\omega_i | x_j)^{w_j}\right)^{W_k}\right]}$$

else $$V = \sum_{j=1}^{N} w_j$$

$$\text{If } \sum_{j=1}^{N} w_j < 1$$

$$W_i = V$$

else $$W_i = V^{\beta_i}$$

$$P(\omega_i | x_1, x_2, \ldots, x_N) = \frac{P(\omega_i)\left(\frac{1}{V}\sum_{j=1}^{N} w_j P(\omega_i | x_j)^{\alpha_i}\right)^{\frac{W_i}{\alpha_i}}}{\sum_{k=1}^{C}\left[P(\omega_k)\left(\frac{1}{V}\sum_{j=1}^{N} w_j P(\omega_k | x_j)^{\alpha_k}\right)^{\frac{W_k}{\alpha_k}}\right]}$$

whereas
$x_i$=Individual classifier execution to be combined
$P(\omega_i)$=Prior probability of the $i^{th}$ class
$P(\omega_i|x_j)$=Posterior probability of the $i^{th}$ class for the $j^{th}$ classifier execution, created without the use of prior probabilities
$P(\omega_i|x_1, \ldots, x_N)$=Posterior probability of the $i^{th}$ class after fusing classifier executions 1 through N N=Number of classifier executions C=Number of object classes $\alpha_i, \beta_i$=Input parameters that determine the type of combining, specified per class $w_j$=Weight associated with the $j^{th}$ classifier execution, default value=1 TOL=tolerance.

17. A computer program product, tangibly embodied in an information carrier, the computer program product including instructions being operable to cause a data processing apparatus to:

determine an alpha parameter, the alpha parameter associated with a fusion function;

determine a beta parameter, the beta parameter associated with a degree of expected independence of a received set of data and the received set of data comprising information associated with a classification of the object;

fuse the received set of data based on the alpha parameter and the beta parameter; and generate a probability of identification of the classification of the object based on the fused data.

* * * * *